United States Patent [19]

Castwall et al.

[11] Patent Number: 5,664,282
[45] Date of Patent: Sep. 9, 1997

[54] VACUUM CLEANER

[75] Inventors: Lennart Wilhelm Castwall, Täby; Magnus Carl Wilhelm Lindmark, Stockholm; Lars Gunnar Moren, Huddinge, all of Sweden

[73] Assignee: Aktiebolaget Electrolux, Stockholm, Sweden

[21] Appl. No.: 507,466
[22] PCT Filed: Jan. 3, 1994
[86] PCT No.: PCT/SE94/00002
§ 371 Date: Aug. 23, 1995
§ 102(e) Date: Aug. 23, 1995
[87] PCT Pub. No.: WO94/15519
PCT Pub. Date: Jul. 21, 1994

[30] Foreign Application Priority Data

Jan. 8, 1993 [SE] Sweden .................................. 9300033

[51] Int. Cl.⁶ ..................................................... A47L 9/28
[52] U.S. Cl. .............................. 15/319; 15/339; 15/344; 15/412
[58] Field of Search .............................. 15/339, 412, 319

[56] References Cited

U.S. PATENT DOCUMENTS 4,969,797   11/1990   Takara et al. .................. 417/423.13 X Primary Examiner—Chris K. Moore
Attorney, Agent, or Firm—Pearne, Gordon, McCoy & Granger LLP

[57] ABSTRACT

A vacuum cleaner includes a suction fan driven by an electric motor, a suction nozzle connected to the intake side of the fan via a dust container, and a cord to supply electric power to the motor. The motor is electronically controlled and adapted to be driven at a speed such that the suction fan operates at a speed of at least 50,000 rpm. The suction fan comprises a fan Impeller of the turbo fan type.

9 Claims, 5 Drawing Sheets

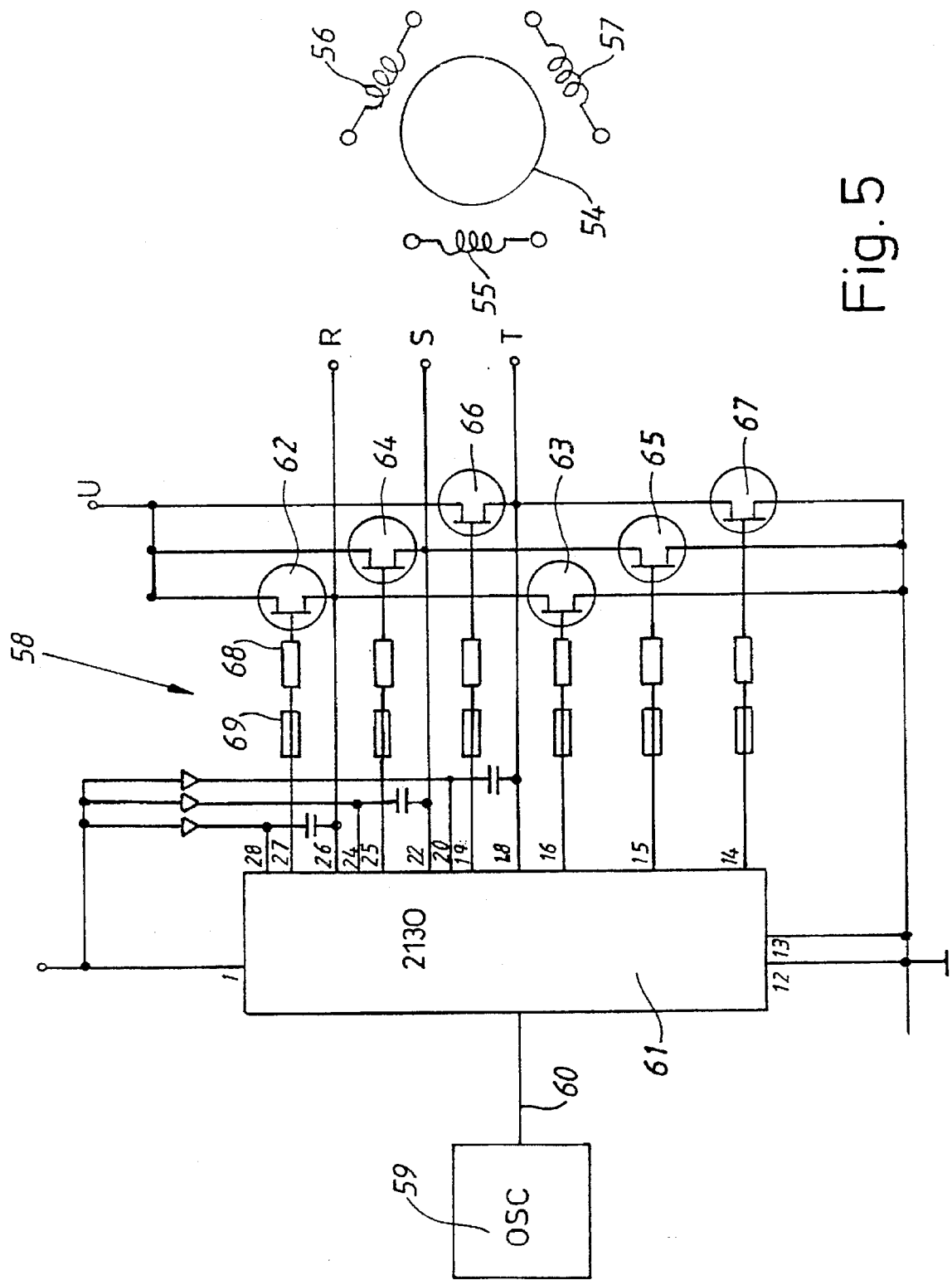

VACUUM CLEANER

The present invention relates to a vacuum cleaner of the kind including a suction fan driven by an electric motor, a suction nozzle connected to the inlet side of the suction fan via a dust container and a flex means provided for the electric power supply of the motor.

The prior art includes vacuum cleaners designed according to a few different philosophies. A common type is the so-called canister vacuum cleaner having the shape of a larger loaf and comprising a suction fan driven by an electric motor. The vacuum cleaner has an inlet opening connected to a suction nozzle via a hose and an extension tube. From the suction nozzle, the air is conducted via the extension tube and the hose into the vacuum cleaner in which the air passes through a filter in the form of a dust container where the dust particles, conveyed by the air, is separated. Then, the air passes through the suction fan and is also led past the motor for the purpose of cooling the same before being let out to the surrounding atmosphere, usually after having passed an additional filter which also acts as a diffusor. When the vacuum cleaner is to be used a person grips a handle provided at the end of the hose turned away from the vacuum cleaner and connecting the hose with the extension tube. In this way the user can move the suction nozzle across the underlying surface and, if needed, the vacuum cleaner, which is provided with wheels, can be moved across the underlying surface by the user pulling the hose.

Another kind of vacuum cleaner is the so-called upright cleaner which comprises a floor unit and a handle part. The floor unit comprises a suction nozzle and, in addition, a rotating brush having a beating effect on soft surfaces, like wall-to-wall carpets. The handle part comprises a larger dust container and also serves as an operating means for controlling the movement of the floor unit across the surface to be cleaned.

The two types of vacuum cleaners referred to above both have considerable weight, of the order of 5–10 kg, and are cumbersome in use due to weight. A particularly difficult situation arises when the vacuum cleaner is to be taken out from or put into a storage cabinet or, for example in a villa, when it is to be moved between two different floors.

On the market there is also a type of vacuum cleaner which to some extent remedies the disadvantage caused by weight. This type of vacuum cleaner, often referred to as a stick vacuum cleaner, is of the same category as the upright cleaner, however, the floor unit comprises a suction nozzle only without any rotating brush and the vacuum cleaner is smaller and also less heavy than the normal upright cleaner. A disadvantage is that for weight reasons the vacuum cleaner is equipped with a smaller motor fan unit causing the vacuum cleaner to be less efficient as compared to the corresponding canister cleaner or upright cleaner.

Based on the stick vacuum cleaner, referred to, the object of the invention is to make this cleaner as efficient as a corresponding vacuum cleaner of the canister type or the upright type and at the same time to reduce the weight even further. In order for this to be achieved it is necessary to focus onto the heaviest unit in the vacuum cleaner, namely the motor fan unit and then, in the first place, the motor.

From turbo units in automobiles it is known that by use of rapidly rotating impellers, small in size, it is possible to introduce under pressure large amounts of air into the intake system of an automotive engine. In this case a high pressure is created by means of the impeller but, of course, a suction force can be created correspondingly. This idea is the basis for the invention, namely that by means of a rapidly rotating impeller, small in size, it would be possible to create a suction effect of the same magnitude as in the vacuum cleaners of the canister or the upright type, respectively, referred to above, however, with reduced dimensions of the suction fan. In this case the impeller is not driven by exhaust gases as in the automobile case but by an electric motor which has to operate at a speed considerably exceeding the speed up to now commonly used in vacuum cleaner motors. With the type of load used the high speed makes it possible to obtain the same power as in a vacuum cleaner of the common type but with reduced dimensions of the motor.

Hence, the object indicated is achieved in a vacuum cleaner of the kind referred to above in which the motor is electronically controlled and is arranged to be driven at a speed causing the suction fan to operate at a speed of at least 50,000 rpm, wherein the suction fan comprises an impeller of the turbo fan type. These characteristic features have been included in the appending claim 1. Preferred embodiments are the subject matter of the accompanying sub-claims.

Other objects and advantages with the invention will appear from the following description of an embodiment with reference to the accompanying drawings on which:

FIG. 5 is a circuit diagram of an electronic control arrangement for the electric motor driving the vacuum cleaner.

As disclosed above, the invention could be said to consist in the transfer of technique used in turbochargers for internal combustion motors to the field of vacuum cleaners and, more specifically, in driving the turbo fan wheel, taken from the turbo techique field, by a high speed electric motor in order to achieve a suction force comparable to that obtained in a conventional vacuum cleaner, at the same time as both the fan wheel and the motor obtain dimensions which are moderate. The technique is usable in connection with vacuum cleaners of all kind but is particularly advantageous in cases where it is desired to reduce the dimensions and accordingly the weight of a vacuum cleaner of the kind referred to as hand vacuum cleaners or stick vacuum cleaners. Hence, the continued description of the invention will be made in connection with an embodiment in the shape of such light-weight and handy stick vacuum cleaner, at the same time as it is to be understood that a motor fan unit provided in the embodiment can be provided also in a conventional floor-supported vacuum cleaner in which the dimensions of the unit do not have the same crucial importance. Irrespective of application, the invention offers the advantage of the suction fan unit operating at considerably greater efficiency as compared to prior art units.

Figure 1:
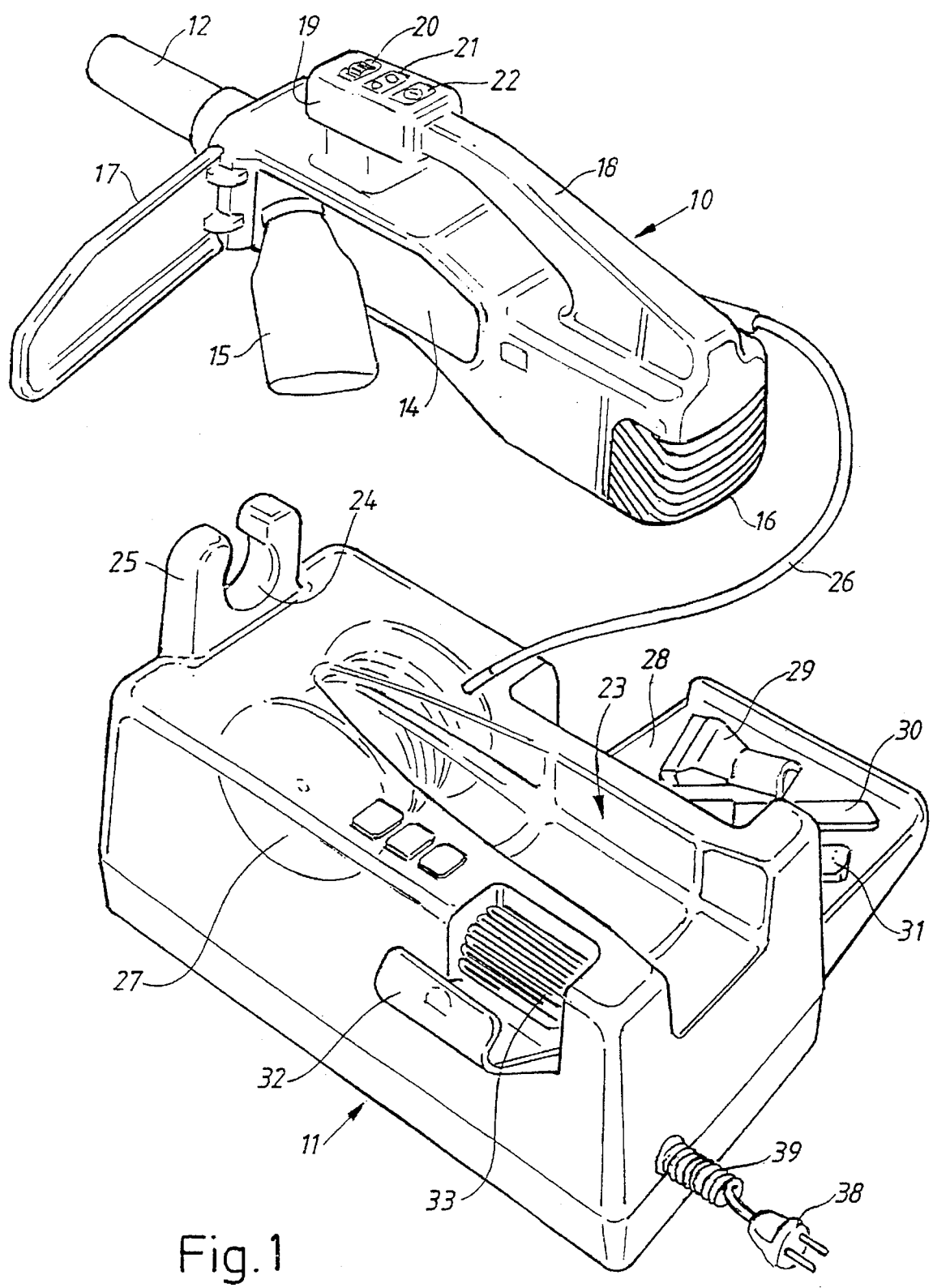
FIG. 1 shows an embodiment including a hand-held vacuum cleaning unit intended to be stored on a stationary unit when not used.
Figure 2:
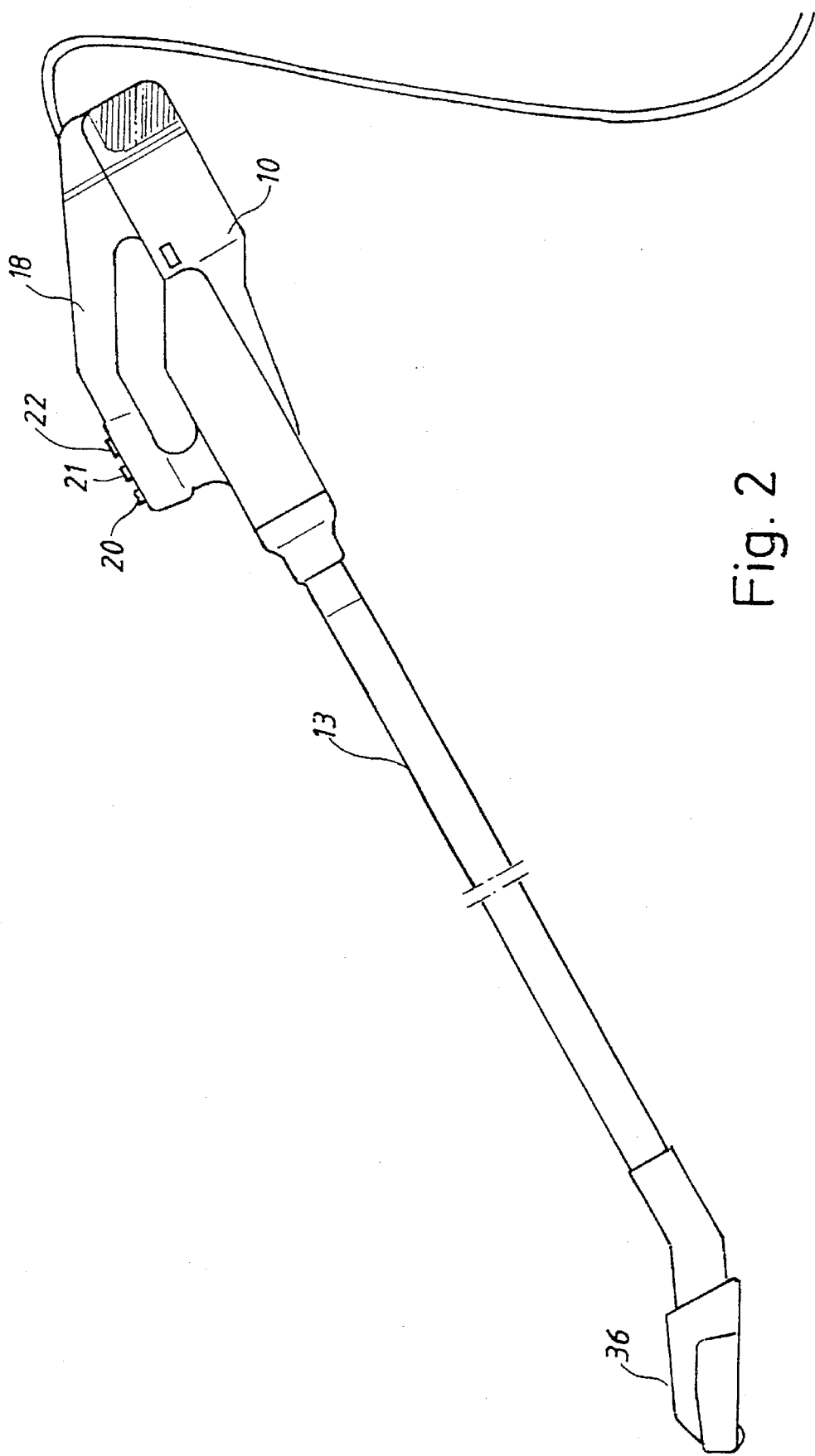
FIG. 2 shows a side view of the hand-held vacuum cleaning unit with attached extension tube and suction nozzle.

As appears in FIG. 1, the vacuum cleaner has been split into two units, viz. a hand unit 10 and a stationary unit 11. The hand unit 10 is provided with a coupling part 12 which makes possible the attachment of a rigid conduit in the shape of an extension tube 13 (FIG. 2), the opposite end of which being connected to a suction nozzle 36. Laterally, the unit 10 is closed by a door 17 inside which a cavity 14 is provided which communicates with the suction side of a motor-fan unit to be described more in detail below. In the cavity 14 a dust container 15 is disposed which separates particles conveyed by the suction air from the suction nozzle 36. In a way not described in detail the dust container can be connected with the door 17 such that the dust container swings out when the door is being opened, thereby facilitating replacement of the dust container. The sucked-in air passes the motor-fan unit (not shown in FIG. 1) and is exhausted via an opening 16 disposed at the rear end of the unit 10. In a way known per se, inside the housing of the unit the opening 16 can be covered by an additional filter called diffusor filter. Moreover, the unit 10 is provided with a handle 18 by means of which the unit can be held when used. Finally, the unit 10 is provided with a control panel 19 disposed at the forward end of the handle and including operating means in the form of push-buttons 20, 21, 22 or the like for the control of the function of the vacuum cleaner.

When not in use the unit 10 is stored on the stationary unit 11. To this end said unit 11 has a recess 23 in which the unit 10 can be inserted and locked in place. The stationary unit 11 is provided with a fastening member 25 having an opening 24 almost completely surrounding the coupling part 12 on the unit 10 when said unit is stored on the stationary unit 11. A cord 26 electrically connects the hand unit 10 with the stationary unit 11 and when the vacuum cleaner is used said flex can be pulled out to the desired lenght in order for vacuuming to take place at a desired distance from the stationary unit. Via a cord 39 and a plug 38 the stationary unit is connectable to a wall outlet connected to the an electric AC mains network. Via a suitable switching means the electric motor disposed in the hand unit 10 is powered via the cord 26. The latter can be wound onto a flex winder 27 which, in a way known per se, (by means of a spring or an electric motor) is arranged to take up the part of the flex not needed. Finally, the stationary unit 11 has a door 28 on which compartments are provided for the storage of various suction nozzles 29, 30, 31. The unit 11 has also a space in which dust containers 33 can be stored and this space is closable by a door 32.

After this general description of the embodiment given, below those parts of the vacuum cleaner will be described by which the important improvements related to the efficiency and function of the vacuum cleaner, discussed above, have been made possible. A prerequisite is the use of a suction fan wheel, called turbo fan wheel, of the type commonly used in turbochargers for internal combustion motors. According to the original concept this wheel is used to give pressure and the wheel is driven by the exhaust gases from the combustion motor via a turbine rotating at a very high speed, often in the range of 100,000 rpm or higher.

In the application of vacuum cleaners there are no exhaust gases and the turbo wheel has to be driven by an electric motor capable of rotating said wheel at the high speeds required, namely in the range above 50,000 rpm. In this connection it is known that the turbo fan wheel, referred to, will not give the required pressure, or alternatively the suction force, with an acceptable efficiency until the speed of the wheel has reached the range indicated. It has proved that with regard to various parameters such as the size of the fan wheel, the quantity of air flowing through and the desired suction force the speed of the fan wheel should exceed 60,000 rpm and particularly optimal results have been obtained at a fan wheel speed of about 100,000 rpm.

Figure 4:
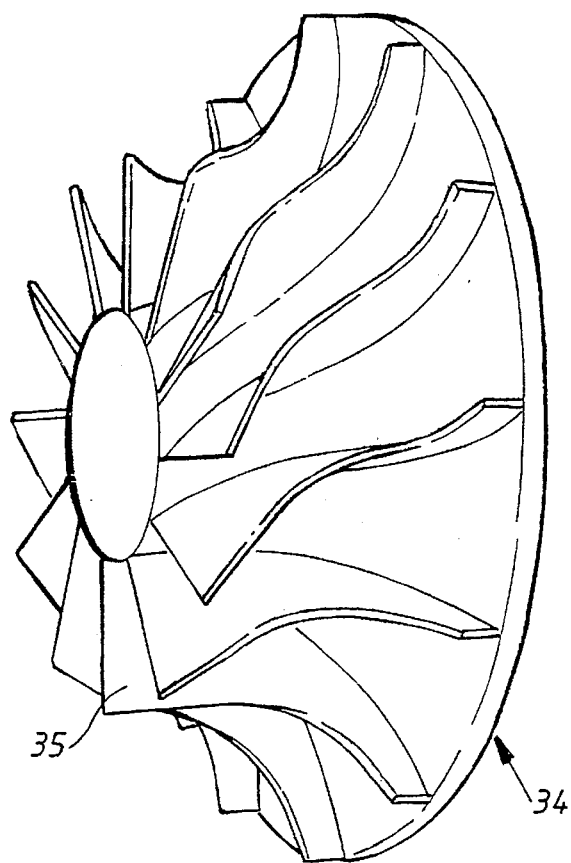
FIG. 4 is a detail view of a turbo fan wheel included in the vacuum cleaning unit of FIG. 3.

As appears in FIG. 4 the turbo fan wheel, denoted by 34, has got a specific form according to which, at the intake side in the centre the wheel has blades 35 which are greatly curved and which assist in shoveling in as much air as possible into the fan. This air, which is sucked in mainly axially in the fan, is then diverted due to the fact that the curvature of the blades diminishes in the direction towards the periphery of the wheel. Adjacent to the periphery the blades extend mainly axially forcing the air to leave the fan in a radial outward direction. Therefore, the turbo fan wheel can be said to operate as an axial fan at the intake side but as a radial fan at the outlet side.

Figure 3:
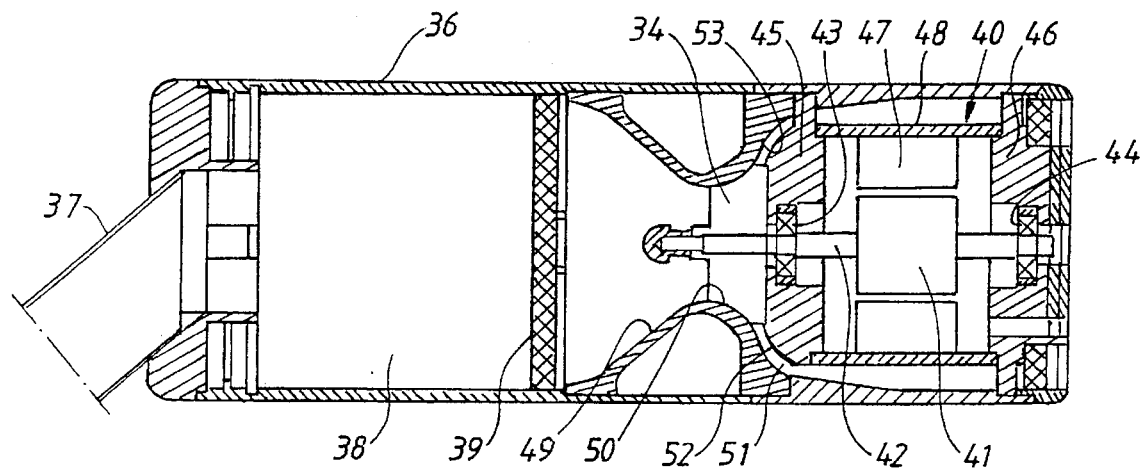
FIG. 3 shows schematically a cross-section of an embodiment of a hand-held vacuum cleaning unit.

In FIG. 3 there is shown a cross-section of a hand-held vacuum cleaning unit according to the invention. The unit comprises a housing 36 having at one end a coupling part 37 provided for the attachment of an extension tube and a suction nozzle. The air sucked in through the coupling part 37 passes through a cavity 38 in which a dust container can be provided for the separating of dust particles. The innermost end of the cavity 38 is covered by a loose filter 39, called crash-filter, preventing the fan wheel which follows from being destroyed in case of the dust container breaking down due to liquid or sharp objects conveyed by the intake air. The motor is denoted by 40 and is of a type operable at high speed. In general, the motor comprises a rotor 41 disposed on a shaft 42 journalled in ball bearings 43, 44 in end shields 45, 46. The rotor cooperates with a stator 47 secured to the housing of the motor, generally denoted by 48. The design of the motor is not critical and, accordingly, the motor has been shown only schematically.

On the motor shaft 42 there is also provided the turbo fan wheel 34 which can be fixed by screws or by other means ensuring a permanent and secure joint despite the high speed of the wheel. The turbo fan wheel cooperates with a fan housing 49 shaped like a funnel to collect the air and direct it towards the air intake at the centre of the wheel. As seen from the side the blades are curved towards the periphery of the wheel and in the curved region 50 the wheel rotates with a very exact fit against the fan housing 49, i.e. a very narrow interspace exists between the two parts. Circumferentially outside the fan wheel 34 the air follows a curved passage 51 diverting the air from a radial to an axial direction so that the air, after having swept past the outside of the motor for cooling of same, is exhausted from the vacuum cleaner in a mainly axial direction.

It should be noted that, advantageously, one of the end shields of the motor can be designed so as to form with the fan housing the curved passage 51. A curved section 52 of the end shield cooperates with a likewise curved section 53 of the fan housing.

As to the choice of motor it is clear that a common series motor is excluded due to the fact that the commutator and the brushes cannot cope with the high speed required for the motor. Accordingly, the choice falls upon an electronically commutated or controlled motor. Suitable motors can be electronically commutated DC-motors, reluctance motors or induction motors. The last-mentioned motor type has a solidly established reputation of being rugged and durable but difficult to control if the motor is to operate at high speeds. If the motor is under heavy and/or varying load the control has to take place by means of so-called acceleration and deceleration ramps with respect to frequency which to a great extent increases the price for the necessary control electronics. In the present case the motor is to drive a fan, which constitutes a very light load, and in the control device it is possible to desist from the various ramp-generating means normally required. The task of the electronic control device is only to set the motor into rotation and then to bring the motor into the desired speed range. This task can be achieved by relatively simple electronic means and the selected motor will then constitute a quite possible choice for the application in a vacuum cleaner also for cost reasons.

As indicated above, in the embodiment a motor of the induction type has been chosen and, more specifically, a three-phase squirrel-cage motor. This motor has a stator provided with a three-phase winding which cooperates with a short-circuited rotor. The motor type is commonly known and described in the literature and will not be described in detail in this context. The motor has been generally denoted by 54 in FIG. 5 and the three stator windings have been schematically traced and denoted by 55, 56 and 57. In a known way, said windings are connected to output terminals R, S and T of the control device shown in FIG. 5 and generally denoted by 58. In the usual way the connection can be a Y-connection or a delta connection.

In its normal operating mode a three-phase scuirrel-cage induction motor is driven directly from a three-phase mains AC-network at a speed determined by the number of poles in the motor and of the frequency of the network. Usually the speed is about 3,000 rpm in case of a two-pole motor. In the present case the motor is to be driven at a speed which is considerably higher and to that end operating voltage has to be applied to the three phases at a frequency being correspondingly higher than the common mains frequency being 50 Hz or 60 Hz. In the embodiment an operating frequency of 1,500 Hz has been chosen.

Mainly, the control device can be considered as a three-phase switch the object of which is to apply to the respective one of the windings of the motor a DC-voltage of the proper magnitude and polarity in order to correspond to a three-phase AC-voltage of the frequency of 1,500 Hz.

The prior art technique suggests a great number of suitable oscillator circuits by which it is possible to generate spike pulses of a proper frequency. By subsequent frequency division, for example by use of a shift register, it is possible to obtain pulses, two for each phase, provided with a time shift such that for each phase a first signal is present to produce a high voltage of positive polarity at the respective output terminal R, S or T whereas the other signal is present to produce a corresponding voltage of the opposite polarity at the output. The function block concerned has been denoted by 59 in FIG. 5 and this block emits pulses on a line schematically denoted by 60. This line is connected to a drive circuit 61, for example of the type 2130, the object of which is to distribute the various pulses to pair of transistors 62,63; 64,65; 66,67, provided for each phase. In the example the transistors are power FET-transistors but transistors of the type IGBT can be used as well. Each transistor 62–66 has an input connected to the drive circuit 61 via a resistor 68 and a fuse 69. Moreover, in each pair the two transistors are connected in series between a supply voltage U and ground. The DC-voltage is generated by rectification and smoothening of a common mains voltage and is of the magnitude of 325 V in case the mains voltage is 230 V.

Figure 6:
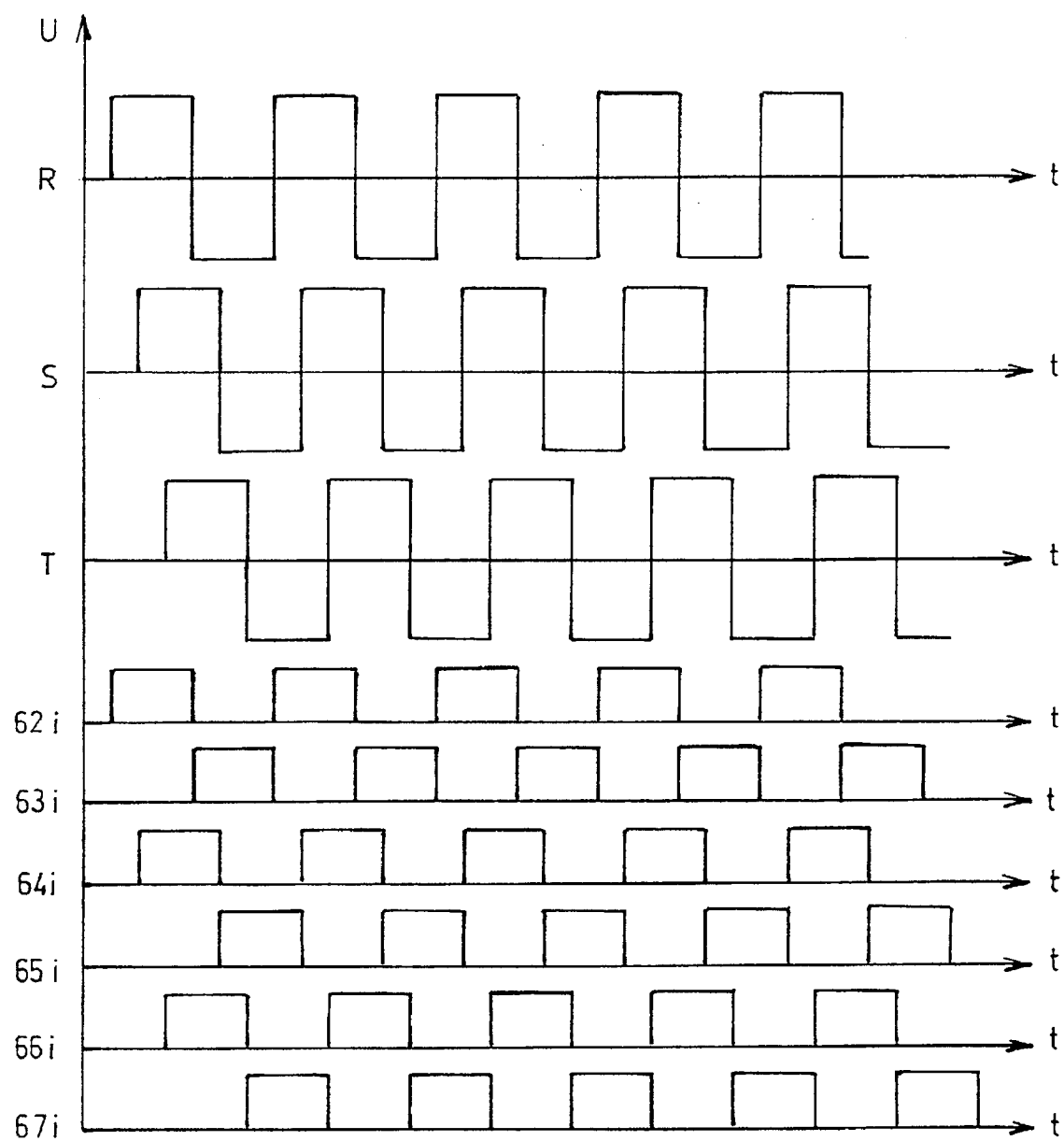
FIG. 6 is a diagram showing different wave forms of voltages appearing in the circuit of FIG. 5.

In FIG. 6 there is shown a diagram illustrating the waveforms of the different pulses which are present in the control device of FIG. 5. At the top of the diagram the waveforms are shown for the three voltages on the output terminals R, S and T. In the usual way these voltages have a phase shift of 120 degrees with respect to one another. For these voltages to be obtained from the control device the different transistor inputs must receive pulses as indicated on subsequent lines in the diagram. The different waveforms have been denoted by the reference numeral of the corresponding transistor 62–67 with the suffix "i". As appears in the diagram, alternatingly the output R obtains high and low level, respectively, by transistor 62 being conductive during the first half of the period while transistor 63 is cut-off and then transistor 63 is conducting during the second half of the period at the same time as transistor 62 is cut-off. During the first half of the period current is led from the terminal U, via the conducting transistor 62 and the output R to the corresponding motor winding. During the second half of the period current is instead led from the motor winding, via the output R and transistor 63, now conducting, to ground. The two remaining transistor pairs 64, 65 and 66,67 are controlled correspondingly by means of pulses indicated on lines 64i, 65i, and 66i, 67i, respectively, in the diagram for generating of the voltages illustrated on lines S and T of the diagram causing current to flow through the corresponding motor windings.

In the diagram the voltage shifts instantly between positive and negativ potential as if the motor had been driven by a sinusoidal voltage of the frequency of the mains. This means that the so-called duty cycle amounts to 50%. If a motor of the kind indicated is driven by square-wave pulses at a duty cycle of 50%, very soon heat problems will appear and the motor be overheated. In order to eliminate this problem the duty cycle has to be reduced to a value lower than 50%, for example 45%. To this end, the pulses to the transistors 62 and 63 must be delayed correspondingly so as to start later in the diagram. The rear end of the pulses, however, appears at the same points of time as shown in the diagram. The corresponding delay must be made with respect to the pulses to the transistors of the pairs 64,65 and 66,67, respectively. The delay of the pulses can be performed in the function block 59 by use of known means including a combination of resistors and capacitors.

As already discussed above, the object of the invention is to provide a device permitting a vacuum cleaner to be given considerably reduced dimensions as compared to a common vacuum cleaner at equal performance. The embodiment shown constitutes an example only of a vacuum cleaner which has got a design for meeting with the object indicated. The important teaching of the invention is that a suction fan having a so-called turbo fan wheel, is driven at a speed of at least 50,000 rpm, whereby a considerably greater efficiency is obtained as compared to that achievable in a vacuum cleaner where a classic type of suction fan is operated at a speed not exceeding ca 20,000 rpm. Due to the greater efficiency the dimensions of the suction fan and drive motor can be greatly reduced, which, if one so desires, can be used to improve the performance of a vacuum cleaner of the stick type with unchanged overall dimensions. Alternatively, the invention can be used in a vacuum cleaner of the classic type in order to make possible a better way of providing space for the storage of suction nozzles and other implements than has been possible in current vacuum cleaners. In the latter the interior of the vacuum cleaner is occupied to a great extent by a powerful and space requiring drive motor with associated radial fan which has also large overall dimensions in a radial direction. Often, the fan is of the two-stage type thereby having a large space demand also axially. As appears from the described embodiment the invention makes it possible to provide a hand vacuum cleaner having overall dimensions comparable to those of a so-called car vacuum cleaner, however, with the performance of a classic floor-supported vacuum cleaner. Advantageously, the hand vacuum cleaner can also be used as a car cleaner for cleaning of upholstery and floor surfaces in the car, offering the suction performance of a floor-supported vacuum cleaner but with the simplified handling associated with the so-called car vacuum cleaner.

What is claimed is:

1. Vacuum cleaner including a suction fan driven by an electric motor, a suction nozzle connected to an intake side of the fan via a dust container, and a cord for supplying electric power to the motor, wherein the motor is electronically controlled and adapted to be driven at a speed such that the suction fan operates at a speed amounting to at least 50,000 rpm and the suction fan comprises a turbo fan wheel-type impeller, wherein an air intake duct for the suction fan is provided, said air intake duct having an hour-glass shape with a central throttle section and a pair of end sections, said end sections being relatively wider than said central throttle section, blades of the impeller closely fitting against the surrounding air intake duct in the area of the throttle section, forming a very narrow gap which, at the outlet side, passes into an annular curved duct diverting the exhaust air from a radial direction into an axial direction.

2. Vacuum cleaner according to claim 1, wherein the suction fan operates at a speed of about 100,000 rpm.

3. Vacuum cleaner according to claim 1, wherein the turbo fan wheel has a hub plate mainly covering an air passageway provided in the fan housing and on which are disposed a plurality of essentially radially directed and axially raised fan blades which, in an area most close to the center of the hub plate, form shovels acting in the direction of rotation of the wheel, whereas the fan blades in a circumferential area of the hub plate change shape so as to extend mainly axially.

4. Vacuum cleaner according to claim 1, wherein the annular curved duct passes into an annular passage which axially surrounds the motor for cooling same and which is connected to an outlet opening for the air flowing through the vacuum cleaner.

5. Vacuum cleaner according to claim 4, wherein the annular curved duct is formed by the surrounding fan housing and an outer surface of an end shield provided at one side of the motor.

6. Vacuum cleaner according to claim 1, wherein the vacuum cleaner includes a hand-held unit comprising the motor and the suction fan with the dust container, the suction nozzle being connected to the intake side of the suction fan by means of a rigid conduit.

7. Vacuum cleaner according to claim 1, wherein the motor is a three-phase induction motor.

8. Vacuum cleaner according to claim 7, wherein an electronic control device is provided for the control of the motor and designed as a separate unit connected to the hand-held unit by the cord means.

9. Vacuum cleaner according to claim 8, wherein the hand-held unit comprises operating means for the control of the motor operating conditions, such as the switching-on, the switching-off and the speed of the motor, said operating means being functionally connected to the separate unit by the cord means.

* * * * *